(12) United States Patent
von Schwertfuehrer et al.

(10) Patent No.: US 7,191,041 B2
(45) Date of Patent: Mar. 13, 2007

(54) METHOD FOR DIAGNOSING AS TO SIGNAL PLAUSIBILITY WITH A SPEED SENSOR OF A MOTOR VEHICLE

(75) Inventors: Gerit von Schwertfuehrer, Ludwigsburg (DE); Christian Muehlbauer, Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 434 days.

(21) Appl. No.: 10/770,439

(22) Filed: Feb. 4, 2004

(65) Prior Publication Data
US 2004/0158372 A1 Aug. 12, 2004

(30) Foreign Application Priority Data
Feb. 6, 2003 (DE) ................ 103 04 739

(51) Int. Cl.
*G01M 17/00* (2006.01)
(52) U.S. Cl. .......................... 701/34; 701/110; 701/31; 340/438; 340/441
(58) Field of Classification Search ................ 701/110, 701/103, 34, 31; 340/438, 441
See application file for complete search history.

(56) References Cited

U.S. PATENT DOCUMENTS

| | | | | |
|---|---|---|---|---|
| 4,193,380 A | * | 3/1980 | Marchak et al. ............. 123/491 |
| 4,245,317 A | * | 1/1981 | Marchak ..................... 701/113 |
| 4,246,639 A | * | 1/1981 | Carp et al. .................. 701/113 |
| 4,408,582 A | * | 10/1983 | Merrick ................. 123/406.46 |
| 4,520,272 A | * | 5/1985 | Danno et al. ............. 290/40 A |
| 4,730,708 A | * | 3/1988 | Hamano et al. ............. 477/114 |
| 4,849,892 A | * | 7/1989 | McCombie ................... 701/94 |
| 4,860,210 A | * | 8/1989 | McCombie ................... 701/93 |
| 4,890,231 A | * | 12/1989 | Frantz ......................... 701/97 |
| 4,896,267 A | * | 1/1990 | Frantz et al. ................. 701/97 |
| 4,973,295 A | * | 11/1990 | Lee ............................ 475/153 |
| 5,251,592 A | * | 10/1993 | Seki et al. ............. 123/198 D |
| 5,343,396 A | * | 8/1994 | Youngblood ................. 701/70 |
| 5,642,722 A | * | 7/1997 | Schumacher et al. ........ 123/673 |
| 5,833,564 A | * | 11/1998 | Harris ........................ 475/149 |
| 6,012,005 A | * | 1/2000 | Gscheidle et al. ............. 701/34 |
| 6,092,021 A | * | 7/2000 | Ehlbeck et al. ............. 701/123 |
| 6,122,577 A | * | 9/2000 | Mergenthaler et al. ....... 701/34 |
| 6,141,960 A | * | 11/2000 | Takami et al. ................ 60/286 |
| 6,834,221 B2 | * | 12/2004 | Jager et al. .................. 701/34 |
| 7,000,595 B2 | * | 2/2006 | Andersson et al. .... 123/406.47 |
| 2003/0015175 A1 | * | 1/2003 | Andersson et al. .... 123/406.47 |
| 2004/0158372 A1 | * | 8/2004 | Schwertfuehrer et al. ..... 701/34 |
| 2004/0182366 A1 | * | 9/2004 | Andersson et al. .... 123/406.47 |

FOREIGN PATENT DOCUMENTS

| | | | |
|---|---|---|---|
| DE | 196 35 440 | * | 8/1996 |
| DE | 19636443 A1 | * | 3/1998 |
| DE | 10304739 A1 | * | 8/2004 |
| WO | PCT/DE00/01832 | * | 6/2000 |

* cited by examiner

*Primary Examiner*—Cuong Nguyen
(74) *Attorney, Agent, or Firm*—Walter Ottesen

(57) ABSTRACT

A method is for making a diagnosis as to signal plausibility in a speed sensor of a motor vehicle. In the method, the speed sensor outputs a pulse sequence to an evaluation circuit in dependence upon the speed of the vehicle and, in a steady-state operating condition of the motor vehicle, a ratio is formed between the determined speed and an engine rpm and the ratio is averaged over a pregiven time. A plausibility is determined only when the formed mean value lies in a value range permissible for the steady-state operating condition.

7 Claims, 2 Drawing Sheets

METHOD FOR DIAGNOSING AS TO SIGNAL PLAUSIBILITY WITH A SPEED SENSOR OF A MOTOR VEHICLE

CROSS REFERENCE TO RELATED APPLICATIONS

This application claims priority of German patent application no. 103 04 739.5, filed Feb. 6, 2003, the entire content of which is incorporated herein by reference.

BACKGROUND OF THE INVENTION

It is already known to connect a speed sensor of a motor vehicle in the form of an rpm sensor directly to an engine control as an evaluation circuit with the sensor being connected via a digital input. The rpm sensor is, for example, mounted on the transmission output end of the motor vehicle. The rpm measured there is an index for the speed of the motor vehicle and is transmitted in the form of a pulse sequence to the digital input of the engine control and is there read in. The received pulse sequence is converted into a vehicle speed in the engine control.

SUMMARY OF THE INVENTION

The method of the invention affords the advantage compared to the above that a ratio between the determined speed and an engine rpm is formed in a steady-state operating condition of the motor vehicle and is averaged over a pregiven time and that a signal plausibility is only determined when the formed mean value lies in a value range permissible for the steady-state operating condition. In this way, the signal plausibility can be realized without additional sensor means. Only such quantities are used for the plausibility check which are anyway already available. This plausibility check requires no significant computation time expenditure and storage space needs.

The method of the invention can thereby be especially easily realized with little complexity and provides the possibility of carrying out the plausibility check of the signal of the speed sensor with a pregiven minimum frequency of occurrence per driving cycle.

It is especially advantageous when the steady-state operating condition is detected and, for the pregiven time, a constant gear or a constant drive stage is engaged. In this way, the steady-state operating condition can be determined in the case of a manually shifted transmission or in the case of an automated shift transmission especially easily and with little complexity and without additional sensor means.

A further advantage results when the steady-state operating condition is detected and the gradient of the ratio between the determined speed and the engine rpm drops below a first pregiven threshold value during the pregiven time. In this way, a steady-state operating condition can also be determined when no manual shift transmission and no automated shift transmission but, for example, an automatic transmission having a hydrodynamic converter is used. Here too, no additional sensor means is required for detecting the steady-state operating condition.

A further advantage results when the steady-state operating condition is detected when a drive pedal value or the engine torque drops below a second pregiven threshold value during the pregiven time. In this way, it is ensured that the diagnostic result in the steady-state operating condition is not affected by too high a converter slip on the automatic transmission having a hydrodynamic converter and falsifies the diagnostic result.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
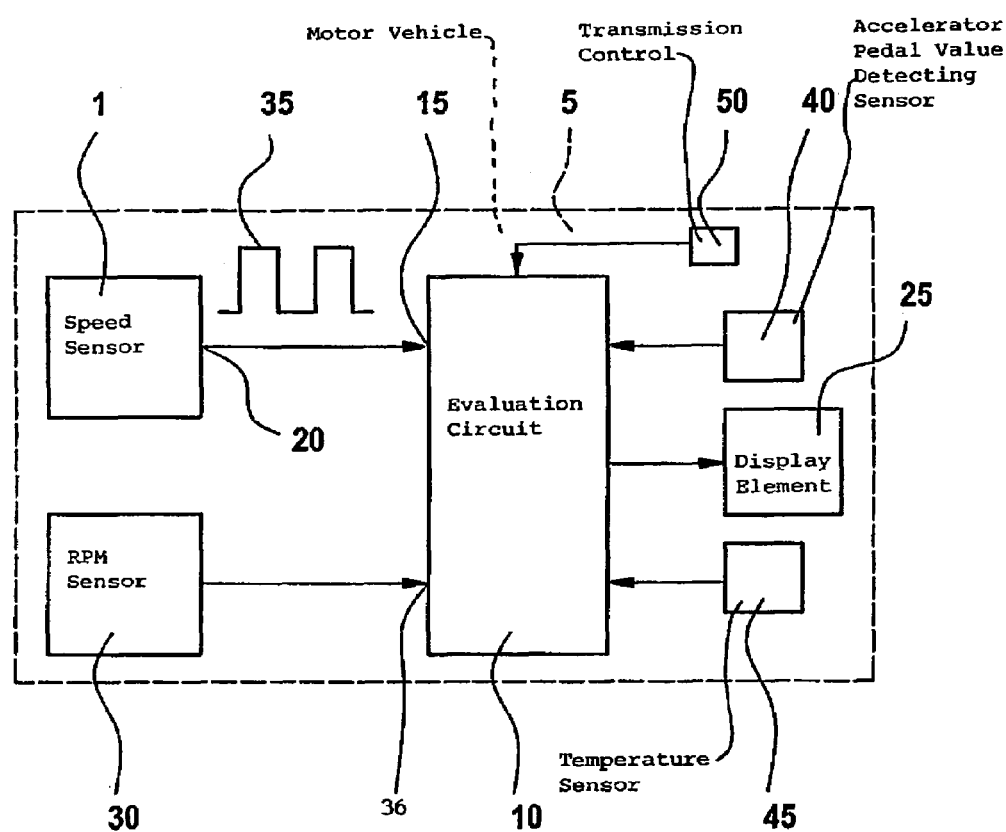
FIG. 1 is a block diagram of a motor vehicle having a speed sensor and an evaluation circuit; and, FIG. 2 is a flowchart showing an exemplary sequence of the method of the invention.

In FIG. 1, reference numeral 5 identifies a motor-driven motor vehicle. The motor of the motor vehicle 5 is not shown in FIG. 1 for reasons of clarity. The motor can, for example, be an internal combustion engine, an electric motor or a motor based on an alternative drive concept. In the case of an internal combustion engine, the motor can be a spark-ignition engine or a diesel engine. The motor vehicle 5 includes a first rpm sensor 1 which, for example, is mounted in the region of a crankshaft of the engine or in the region of a transmission output end drive shaft of the motor vehicle 5 and detects the rpm of the crankshaft or of the transmission output end drive shaft with this rpm being directly proportional to the speed of the vehicle.

In FIG. 1, the transmission of the motor vehicle 5 is likewise not shown for reasons of clarity. In the following, it will be assumed by way of example that the rpm sensor 1 detects the rpm of the transmission output end drive shaft. The rpm sensor 1 can, for example, include a transducer wheel, which is likewise not shown in FIG. 1, and which is driven by the drive shaft and outputs a pulse sequence 35 at its signal output 20 of the speed sensor 1. The pulse sequence 35 is an index for the detected rpm of the drive shaft.

The pulse sequence 35 is supplied as an output signal of the rpm sensor 1 to the digital input 15 of an evaluation circuit 10 of the motor vehicle 5 which, for example, can be integrated into an engine control of the motor vehicle 5. The evaluation circuit 10 determines a speed of the motor vehicle 5 from the number of received pulses per unit of time. Especially the transmission ratio is considered in this conversion. The conversion takes place in a manner known per se and is not the subject matter of this invention.

The rpm sensor 1 functions as a speed sensor and is referred to as such in the following. The higher the resolution of the transducer wheel of the speed sensor 1 is, the more pulses are transmitted to the evaluation circuit 10 at a given speed. This means that the speed can be computed in the evaluation circuit 10 with a higher accuracy. In this way, especially lower speeds can be reliably determined; whereas, for higher speeds, a higher complexity as to computation occurs in the speed computation because of the higher number of pulses. The evaluation of the received pulse sequence 35 can take place in the evaluation circuit 10, for example, with the aid of a sensor pulse counter. The sensor pulse counter is not shown in FIG. 1 for reasons of clarity. The sensor pulse counter is incremented for each hardware interrupt triggered by the speed sensor 1 in the evaluation circuit 10. A hardware interrupt is triggered for each flank change of the input voltage at the digital input 15 and therefore the pulse sequence 35. The flank change of the input voltage is caused by the transducer wheel of the speed sensor. The evaluation of the sensor pulse counter takes place time triggered in a fixed time raster. A time raster of this kind can, for example, have a duration of 20 ms.

The speed is derived from the number of hardware interrupts in a manner known per se especially while considering the transmission ratio. The hardware interrupts are triggered at the digital input 15 in a fixed time raster of, for example, 20 ms.

According to FIG. 1, the motor vehicle 5 includes a second rpm sensor 30. The second rpm sensor 30 is mounted, for example, in the region of the crankshaft of the engine and measures the engine rpm of the motor vehicle 5. The second rpm sensor 30 can also be equipped with a transducer wheel which, in the same way as speed transducer 1, generates a pulse sequence in dependence upon the detected rpm and outputs the same to the evaluation circuit 10. The evaluation circuit 10 can then likewise, with the aid of a second sensor pulse counter, evaluate the pulse sequence, which is supplied by the second rpm sensor 30, and determine the triggered hardware interrupts at a second digital input 36 to which the pulse sequence of the second rpm sensor 30 is supplied. The number of hardware interrupts, which are triggered at the second digital input 36, is then an index for the engine rpm of the motor vehicle 5. Evaluation of the second sensor pulse counter likewise takes place time-triggered within a fixed time raster of, for example, 20 ms. The engine rpm is then derived in the evaluation circuit 10 from the number of hardware interrupts in a manner known per se. The hardware interrupts are triggered in the fixed time raster at the second digital input 36.

The evaluation circuit 10 executes a diagnosis as to signal plausibility of the signal received by the speed sensor 1. The evaluation circuit 10 is connected to a display element 25 on which the diagnostic result can be shown and which display element 25 can be integrated, for example, in a combination instrument of the motor vehicle 5.

The diagnosis as to signal plausibility is realized via the evaluation of the ratio of the vehicle speed (v) to the engine rpm (n). For the steady-state operating condition of the motor vehicle 5, which is characterized by a constant gear or a constant gear selection, a fixed v/n-ratio adjusts in a coupled state for manually shifted transmissions and automated shift transmissions and, for automatic transmissions having hydrodynamic converters, an approximately fixed v/n-ratio adjusts. This fixed or approximately fixed v/n-ratio is determined via the particular transmission ratio of the individual gear stages. If the v/n-ratio, which was averaged over a pregiven time, deviates for a constant gear or a constant gear selection by more than an applicable magnitude from a pregiven value, then the signal or pulse sequence 35 of the speed sensor 1 is detected as not plausible. The signal or pulse sequence 35 is supplied by the speed sensor 1. Otherwise, the signal, which is supplied by the speed sensor 1, is seen as plausible. The evaluation circuit is not informed as to the instantaneous gear or instantaneous gear selection of the transmission in each embodiment of the motor vehicle 5, for example, via a vehicle-specific bus system such as a CAN bus, by a transmission control apparatus or, in the case of a manually shifted transmission, via a clutch switch. For this reason, the steady-state operating condition can be determined also on the basis of the vehicle speed, which is determined with the aid of the speed sensor 1, and the engine rpm, which is determined with the aid of the second rpm sensor 30. Here, the steady-state operating condition can be detected by the evaluation circuit 10 when the magnitude of the time-dependent gradient of the v/n-ratio lies in the pregiven fixed time raster of approximately 20 ms below a first pregiven threshold value.

The diagnosis as to signal plausibility is only carried out when the steady-state operating condition was detected in the evaluation circuit 10 because only then a reliable diagnosis as to signal plausibility of the signal outputted by the speed sensor 1 is possible.

Especially in the case of the use of an automatic transmission having a hydrodynamic converter, it is necessary for a reliable diagnosis as to signal plausibility of the signal supplied by the speed sensor 1 that a degree of actuation of an accelerator pedal of the motor vehicle (which is hereinafter referred to also as the accelerator pedal value) or the engine torque lie below a second pregiven threshold value. For intense actuation of the accelerator pedal, that is, for a high accelerator pedal value, a high converter slip is generated for such an automatic transmission which acts disturbingly on the v/n-ratio and prevents a reliable diagnosis as to signal plausibility.

In the case of automatic transmissions having a hydrodynamic converter, for the presence of the steady-state operating condition (which is required as a condition precedent for the diagnosis as to signal plausibility of the signal supplied by the speed sensor 1), it can be provided as an additional condition that the accelerator pedal value or the engine torque lies below the second pregiven threshold value.

For the reliability of the diagnosis as to signal plausibility of the signal supplied by the speed sensor 1, it can be further provided that the vehicle speed lies above a third pregiven threshold value and/or that an engine temperature exceeds a fourth pregiven threshold value. Therefore, as an additional criterion for the presence of the steady-state operating condition and therefore as a condition precedent for the execution of the diagnosis as to the signal plausibility of the signal supplied by the speed sensor 1, a check can be made in the evaluation circuit 10 as to whether the vehicle speed lies above the third pregiven threshold value and/or whether the engine temperature lies above the fourth pregiven threshold value.

For detecting an accelerator pedal value, the motor vehicle 5 includes an accelerator pedal value detection sensor 40, which is configured in this example according to FIG. 1 as a potentiometer by way of example. The sensor 40 detects the degree of actuation of the accelerator pedal and therewith the accelerator pedal value and transmits the same to the evaluation circuit 10. Furthermore, the motor vehicle 5 includes, in this example, a temperature sensor 45 which detects the engine temperature, for example, based on engine oil temperature and transmits the same to the evaluation circuit 10.

The first pregiven threshold value and the second pregiven threshold value can be applied on a test stand in that, for a correctly operating speed sensor 1 and a correct output signal of the speed sensor 1, the two threshold values are so pregiven that the resulting v/n-ratio in average over the pregiven time just still lies in the value region permissible for the instantaneous constant gear or the instantaneous constant gear selection. The check of the accelerator pedal value for the detection of the steady-state operating condition is required only in the case of the use of an automatic transmission having a hydrodynamic converter.

The third and the fourth pregiven threshold values can, for example, be pregiven by statute.

The detection of the steady-state operating condition takes place during the pregiven time, that is, during the fixed pregiven time raster of, for example, 20 ms. During this time raster, the set gear or the set gear selection must be constant for the detection of the steady-state operating condition with the aid of the set gear or the set gear selection. If the steady-state operating condition is detected with the aid of the time-dependent gradient of the v/n-ratio, then, during this pregiven time raster, each gradient must drop, in magnitude, below the first pregiven threshold value. If the steady-state operating condition is detected in dependence upon the accelerator pedal value, then this accelerator pedal value must drop below the second pregiven threshold value during the pregiven time raster. If the steady-state operating condition is detected with the aid of the determined speed, then the determined speed must exceed the third pregiven threshold value during the pregiven time raster. If the steady-state operating condition is detected with the aid of the engine temperature, then the engine temperature must exceed the fourth pregiven threshold value during the pregiven time raster.

When the steady-state operating condition is present during the pregiven time raster, that is, during the pregiven time, then the comparison takes place of the v/n-ratio, which is averaged over the pregiven time (that is, over the pregiven time raster), to the permissible value range for the gear or gear selection which is set during the pregiven time or the pregiven time raster. If the v/n-ratio, which is averaged in this way, lies in the permissible value range, then the signal, which is outputted by the signal sensor 1, is recognized as plausible, otherwise it is diagnosed as not plausible.

Figure 2:
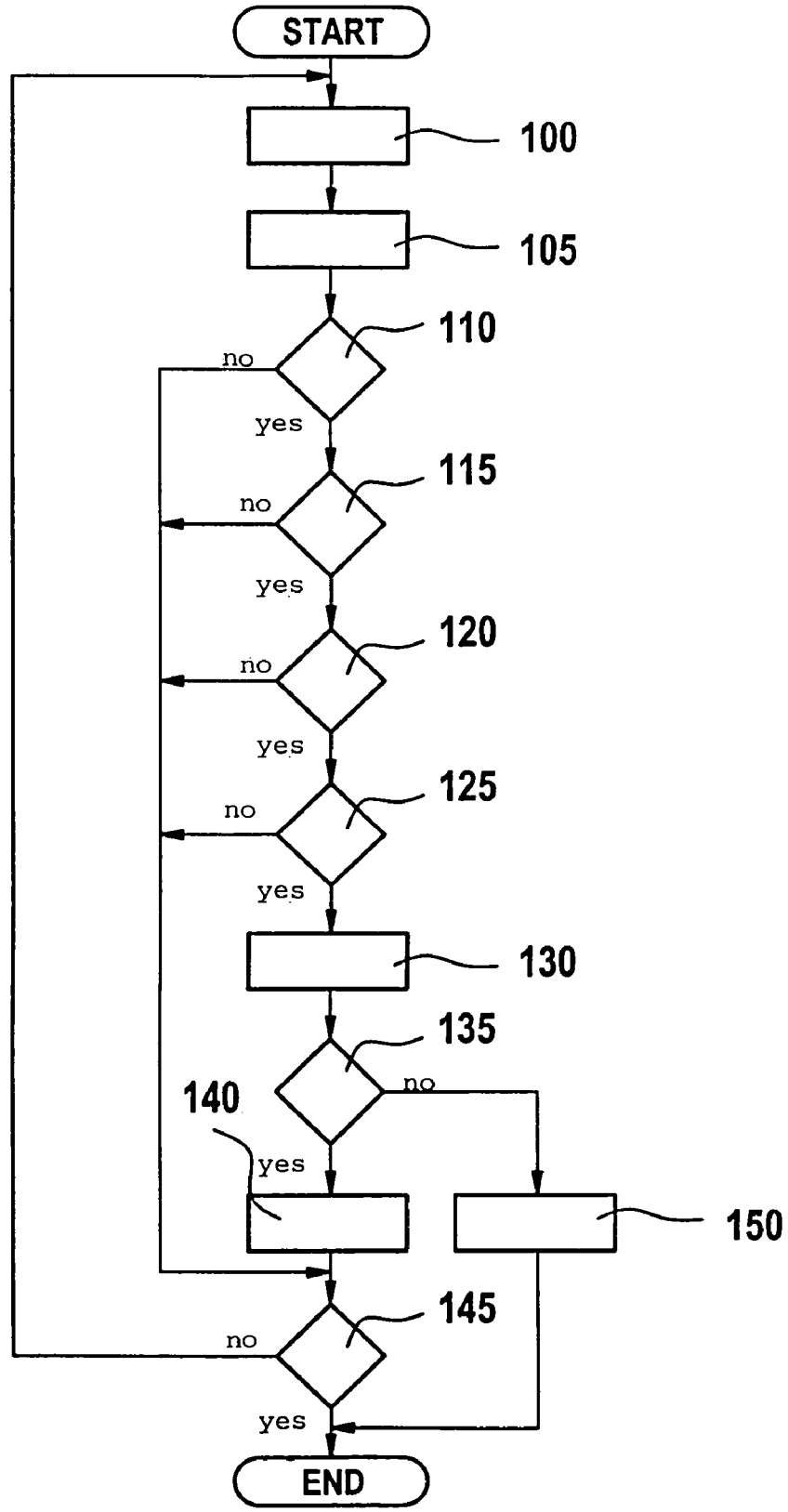

In FIG. 2, a flowchart for an exemplary sequence of the method of the invention is shown. After the start of the program in a driving cycle of the vehicle, the evaluation circuit 10 determines, in the manner described at program point 100, a time-dependent trace of the vehicle speed (v) and the engine rpm (n) during a pregiven time of 20 ms in this example which defines the time raster used for the subsequent diagnosis. In this embodiment, it should furthermore be assumed that the vehicle 5 includes an automatic transmission having a hydrodynamic converter. Therefore, at program point 100, the time-dependent course of the accelerator pedal value is also determined in the pregiven time raster in the evaluation circuit 10. In this embodiment, the evaluation circuit 10 further determines at program point 100 the time-dependent course of the engine temperature in the pregiven time raster. Thereafter, the program branches to program point 105.

At program point 105, the evaluation circuit 10 computes the time-dependent course of the v/n-ratio during the pregiven time and forms the time-dependent gradient from this course. Thereafter, the program branches to program point 110.

At program point 110, the evaluation circuit 10 checks whether the time-dependent gradient of the v/n-ratio has, in magnitude, dropped below the first pregiven threshold value during the pregiven time. Additionally, or alternatively, the evaluation circuit 10 can also check at program point 110 as to whether the set gear or set gear selection was constant during the pregiven time. The evaluation circuit 10 can obtain the corresponding data from a clutch switch or from a transmission control 50. If, at program point 110, it is determined by the evaluation circuit 10 that neither the time-dependent gradient of the v/n-ratio exceeds, in magnitude, the first pregiven threshold value during the pregiven time nor a gear change or a change of gear selection takes place during the pregiven time, depending on which of the two conditions is checked at program point 110, then the program branches to program point 115; otherwise, the program branches to program point 145.

At program point 115, the evaluation circuit 10 checks in this embodiment as to whether the accelerator pedal value always remains below the second pregiven threshold value during the pregiven time. If this is the case, then the program branches to program point 120; otherwise, the program branches to program point 145.

At program point 120, the evaluation circuit 10 checks whether the speed, which was determined by the speed sensor 1, always lies above the third pregiven threshold value during the pregiven time. If this is the case, then the program branches to program point 125; otherwise, the program branches to program point 145.

At program point 125, the evaluation circuit 10 checks whether the engine temperature always exceeds the fourth threshold value during the pregiven time. If this is the case, then the program branches to program point 130; otherwise, the program branches to program point 145.

At program point 130, the evaluation circuit 10 has, for the pregiven time, detected a steady-state operating condition of the vehicle 5 and therefore the precondition for the diagnosis as to signal plausibility of the signal supplied by the speed sensor 1 and computes a mean value from the time-dependent course of the v/n-ratio during the pregiven time. The mean value can, for example, be the arithmetic mean value of the v/n-ratio during the pregiven time. Thereafter, the program branches to program point 135.

At program point 135, the evaluation circuit 10 checks whether the formed mean value of the v/n-ratio lies within the region pregiven for the gear or gear selection set during the pregiven time. If this is the case, then the program branches to program point 140; otherwise, the program branches to program point 150. The ranges, which are pregiven for the individual possibly set gears or gear selections, can be stored in the evaluation circuit 10 or in a memory assigned to the evaluation circuit 10.

At program point 140, the signal, which is supplied by the speed sensor 1, is diagnosed as plausible and a corresponding visual indication on the display element 25 is caused. Thereafter, the program branches to program point 145.

At program point 150, the evaluation circuit 10 diagnoses the signal, which is supplied by the speed sensor 1, as non-plausible and triggers a corresponding visual indication on the display element of the motor vehicle 5. Thereafter, there is a movement out of the program.

At program point 145, the evaluation circuit 10 checks whether the instantaneous driving cycle was ended, for example, by switching off the engine. If this is the case, then there is a movement out of the program; otherwise, the program branches back to program point 100.

After branching back from program point 145 to program point 100 in the flowchart of FIG. 2, a new pregiven time or a new pregiven time raster of, in this example, 20 ms is used for a renewed check as to the presence of a steady-state operating condition and, if needed, a diagnosis as to signal plausibility.

With the method of the invention, it is ensured that, in a driving cycle, a steady-state operating condition is recognized and therewith a diagnosis of the signal can be carried out which is supplied by the speed sensor 1.

In the embodiment described here, the speed sensor 1 is connected directly to the evaluation circuit 10.

In the flowchart shown in FIG. 2, the check of the accelerator pedal value at program point 115 is primarily purposeful when an automatic transmission having a hydrodynamic converter is used. The check of the set gear or set gear selection at program point 110 is purposeful when, in the evaluation circuit 10, the data as to the set gear or the set gear selection are present. The method of the invention for the plausibility check of the output signal of the speed sensor 1 is independent of the physical quantity which is measured by the speed sensor 1, here in this embodiment the rpm. For realizing the method of the invention, any desired known speed sensor can be used which makes possible a determination of the vehicle speed via the evaluation circuit 10 during the pregiven time.

If the formed mean value of the v/n-ratio lies, for the diagnosis as to signal plausibility, in the value range permissible for the set gear or the set gear selection during the pregiven time, then the formed mean value lies during the pregiven time in the value range permissible for the steady-state operating condition. For the diagnosis as to signal plausibility, it is required that the gear or the gear selection, which is set during the pregiven time, is known in the evaluation circuit 10, that is, it was transmitted, for example, from the transmission control 50 or from a clutch switch to the evaluation circuit 10.

It is understood that the foregoing description is that of the preferred embodiments of the invention and that various changes and modifications may be made thereto without departing from the spirit and scope of the invention as defined in the appended claims.

What is claimed is:

1. A method for making a diagnosis as to signal plausibility in a speed sensor of a motor vehicle, the method comprising the steps of:
   - causing said speed sensor to output a pulse seguence to an evaluation circuit in dependence upon the speed of the vehicle;
   - in a steady-state operating condition of said motor vehicle, repeatedly forming a ratio between a determined speed and a motor rpm during a pregiven time and computing the mean value of the ratios formed over said pregiven time; and,
   - only determining said signal plausibility when said mean value lies in a value range permissible for the steady-state operating condition.

2. The method of claim 1, comprising the further step of detecting the steady-state operating condition when a constant gear or a constant gear selection is set for said pregiven time.

3. The method of claim 1, comprising the further step of detecting the steady-state operating condition when a gradient of said ratio drops, in magnitude, below a first pregiven threshold value during said pregiven time.

4. The method of claim 1, comprising the further step of detecting the steady-state operating condition when an accelerator pedal value or motor torque drops below a second pregiven threshold value during said pregiven time.

5. The method of claim 1, comprising the further step of detecting the steady-state operating condition when the determined speed exceeds a third pregiven threshold during said pregiven time.

6. The method of claim 1, comprising the further step of detecting the steady-state operating condition when the motor temperature exceeds a fourth pregiven threshold value.

7. A method for making a diagnosis as to signal plausibility in a speed sensor of a motor vehicle, the method comprising the steps of:
   - causing said speed sensor to output a pulse sequence dependent upon the speed of the vehicle;
   - supplying said pulse sequence to an evaluation circuit wherein a speed of the vehicle is determined from said pulse sequence to provide a determined speed;
   - causing an rpm sensor to supply an rpm signal to said evaluation circuit indicative of motor rpm;
   - repeatingly forming a ratio of said determined speed and said motor rpm during a pregiven time and computing the mean value of the ratios formed over said pregiven time; and,
   - only determining said signal plausibility when said mean value lies in a value range permissible for the steady-state operating condition.

* * * * *